US012731043B2

(12) United States Patent
Wang et al.

(10) Patent No.: US 12,731,043 B2
(45) Date of Patent: Sep. 8, 2026

(54) METHOD FOR TRAINING MULTIVARIATE RELATIONSHIP GENERATION MODEL, ELECTRONIC DEVICE AND MEDIUM

(71) Applicant: BEIJING BAIDU NETCOM SCIENCE AND TECHNOLOGY CO., LTD., Beijing (CN)

(72) Inventors: Quan Wang, Beijing (CN); Haifeng Wang, Beijing (CN); Yajuan Lyu, Beijing (CN); Yong Zhu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 1388 days.

(21) Appl. No.: 17/480,575

(22) Filed: Sep. 21, 2021

(65) Prior Publication Data

US 2022/0004892 A1 Jan. 6, 2022

(30) Foreign Application Priority Data

Dec. 21, 2020 (CN) ......................... 202011520491.4

(51) Int. Cl.
*G06N 5/022* (2023.01)
*G06F 40/205* (2020.01)
(Continued)

(52) U.S. Cl.
CPC ........... *G06N 5/022* (2013.01); *G06F 40/205* (2020.01); *G06F 40/30* (2020.01); *G06N 20/00* (2019.01)

(58) Field of Classification Search
CPC .......... G06N 5/02; G06N 5/022; G06N 20/00; G06F 40/205; G06F 40/30
See application file for complete search history.

(56) References Cited

U.S. PATENT DOCUMENTS

2015/0339379 A1* 11/2015 Inagaki ............... G06F 16/3344 707/776
2018/0260389 A1 9/2018 Bahrami et al.
(Continued)

FOREIGN PATENT DOCUMENTS

CN 108304911 A 7/2018
CN 110674317 A 1/2020
(Continued)

OTHER PUBLICATIONS

Nathani et al., "Learning Attention-based Embeddings for Relation Prediction in Knowledge Graphs," arXiv:1906.01195v1 [cs.LG] Jun. 4, 2019 (Year: 2019).*
(Continued)

*Primary Examiner* — Miranda M Huang
*Assistant Examiner* — Yao David Huang
(74) *Attorney, Agent, or Firm* — Osha Bergman Watanabe & Burton LLP

(57) ABSTRACT

A method for training a multivariate relationship generation model, an electronic device and a medium are provided. The technical solution includes: obtaining a plurality of knowledge text entries; performing semantic parsing on each knowledge text entry to obtain a plurality of entities and semantic information of each knowledge text entry; constructing a heterogeneous graph based on the plurality of entities and the semantic information; and training an initial artificial intelligence (AI) network model based on the heterogeneous graph to obtain a multivariate relationship generation model.

9 Claims, 5 Drawing Sheets

(51) Int. Cl.
*G06F 40/30* (2020.01)
*G06N 20/00* (2019.01)

(56) References Cited

U.S. PATENT DOCUMENTS

| | | | | |
|---|---|---|---|---|
| 2019/0244107 | A1* | 8/2019 | Murez | G06N 3/096 |
| 2020/0057946 | A1 | 2/2020 | Singaraju et al. | |
| 2020/0218988 | A1 | 7/2020 | Boxwell et al. | |
| 2020/0380211 | A1 | 12/2020 | Fan et al. | |
| 2020/0394263 | A1* | 12/2020 | Ganu | G06F 40/284 |

FOREIGN PATENT DOCUMENTS

| | | | |
|---|---|---|---|
| CN | 110727806 | A | 1/2020 |
| CN | 110765235 | A | 2/2020 |
| CN | 111241295 | A | 6/2020 |
| CN | 111950291 | A | 11/2020 |
| CN | 111950293 | A | 11/2020 |
| KR | 20200096133 | A | 8/2020 |
| WO | 2010081238 | A1 | 7/2010 |

OTHER PUBLICATIONS

Wang et al., “Heterogeneous Graph Attention Network,” WWW ’19, May 13-17, 2019, San Francisco, CA, USA (Year: 2019).*

Sun et al., “Multi-modal Knowledge Graphs for Recommender Systems,” CIKM ’20, Oct. 19-23, 2020, Virtual Event, Ireland (Year: 2020).*

Office Action issued in Korean Application No. 10-2021-0167756, mailed on Jan. 23, 2025 (14 pages).

Extended European Search Report issued in corresponding EP Application No. 21198333.3 dated Mar. 25, 2022 (7 pages).

Office Action issued for Japanese patent application No. 2021-195422, mailed Dec. 20, 2022 (4 pages).

Office Action issued for Chinese patent application No. 202011520491.4, mailed Jun. 27, 2023 (18 pages).

Tengyuan Cai, “A Network Graph Model for Scientific Article and Its Tag Recommendation Method;” A Master Thesis Submitted to University of Electronic Science and Technology China; 1956 (77 pages).

Office Action Issue in Korean Application No. 10-2021-0167756, Mailed on Sep. 29, 2025 [12 Pages].

* cited by examiner

METHOD FOR TRAINING MULTIVARIATE RELATIONSHIP GENERATION MODEL, ELECTRONIC DEVICE AND MEDIUM

CROSS-REFERENCE TO RELATED APPLICATIONS

This application claims the benefit of priority to Chinese Application No. 202011520491.4, filed on Dec. 21, 2020, the contents of which are incorporated herein by reference in their entirety.

TECHNICAL FIELD

The present disclosure relates to a field of computer technology, specifically to a field of artificial intelligence (AI) technologies such as natural language processing (NLP), deep learning (DL), knowledge graph (KG), etc., and particularly to a method for training a multivariate relationship generation model, an electronic device and a medium.

BACKGROUND

Artificial intelligence (AI) is a discipline that studies computers to simulate certain thinking processes and intelligent behaviors (such as learning, reasoning, thinking, planning, etc.) of human beings, which covers hardware-level technologies and software-level technologies.

AI hardware technologies generally include technologies such as sensors, dedicated AI chips, cloud computing, distributed storage, big data processing, etc.; AI software technologies mainly include computer vision technology, speech recognition technology, natural language processing (NLP) technology and machine learning (ML)/deep learning (DL), big data processing technology, knowledge graph (KG) technology, etc.

The knowledge graph is a structured knowledge base composed of entities and relations, which is configured to describe world, domain and language knowledge. Generally, the KG generally relates to a binary relationship between entities, and represents knowledge entries by a triple in the form of subject, predicate, object), for example, (Mary Curie, gained award, Nobel Prize in Physics).

SUMMARY

A method for training a multivariate relationship generation model, an electronic device, a storage medium and a computer program product are provided.

According to a first aspect, a method for training a multivariate relationship generation model is provided. The method includes: obtaining a plurality of knowledge text entries; performing semantic parsing on each knowledge text entry to obtain a plurality of entities and semantic information of each knowledge text entry; constructing a heterogeneous graph based on the plurality of entities and the semantic information; and training an initial artificial intelligence (AI) network model based on the heterogeneous graph to obtain a multivariate relationship generation model.

According to a second aspect, an electronic device is provided. The electronic device includes at least one processor; and a memory communicatively coupled to the at least one processor. The memory stores instructions executable by the at least one processor, and the instructions are executed by the at least one processor, so that the at least one processor can execute the method for training a multivariate relationship generation model according to embodiments of the present disclosure.

According to a third aspect, a non-transitory computer-readable storage medium storing computer instructions is provided. The computer instructions are configured to cause a computer to execute a method for training a multivariate relationship generation model in embodiments of the present disclosure.

It should be understood that, the content described in the part is not intended to recognize key or important features of embodiments of the present disclosure, nor intended to limit the scope of the present disclosure. Other features of the present disclosure will be easy to understand through the following specification.

BRIEF DESCRIPTION OF THE DRAWINGS

The drawings are intended to better understand the solution, and do not constitute a limitation to the disclosure.

DETAILED DESCRIPTION

The exemplary embodiments of the present disclosure are described as below with reference to the accompanying drawings, which include various details of embodiments of the present disclosure to facilitate understanding, and should be considered as merely exemplary. Therefore, those skilled in the art should realize that various changes and modifications may be made to the embodiments described herein without departing from the scope and spirit of the present disclosure. Similarly, for clarity and conciseness, descriptions of well-known functions and structures are omitted in the following descriptions.

Figure 1:
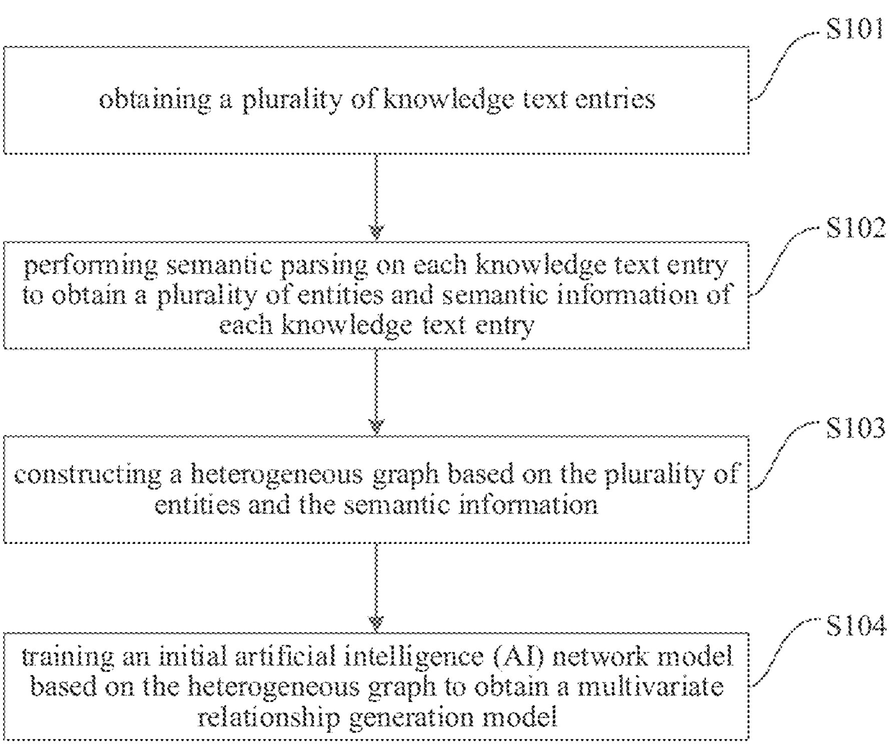
FIG. 1 is a flow chart illustrating a method for training a multivariate relationship generation model according to a first embodiment of the present disclosure.

FIG. 1 is a flow chart illustrating a method for training a multivariate relationship generation model according to a first embodiment of the present disclosure.

It should be noted that, an execution subject of the method for training a multivariate relationship generation model in the embodiment may be an apparatus for training a multivariate relationship generation model, and the apparatus may be implemented by means of software and/or hardware and may be configured in an electronic device, and the electronic device may include but is not limited to a terminal, a server, etc.

The embodiments of the present disclosure relate to a field of artificial intelligence (AI) technologies such as natural language processing (NLP), deep learning (DL), knowledge graph (KG), etc.

Artificial Intelligence, abbreviated as AI in English, is a new science of technology that studies and develops theories, methods, technologies and application systems configured to simulate, extend and expand human intelligence.

Deep learning (DL) learns inherent law and representation hierarchy of sample data, and information obtained in the learning process is of great help in interpretation of data such as words, images and sounds. The final goal of DL is that the machine may have analytical learning ability like human beings, which may recognize data such as words, images, sounds, etc, Natural language processing (NLP) studies all kinds of theories and methods that may achieve effective communication between human and computer by natural language.

Knowledge graph (KG) is a modern theory that combines theories and methods of applied mathematics, graphics, information visualization technology, information science and other disciplines with metrological citation analysis, co-occurrence analysis and other methods, and uses visual graphs to vividly display the core structure, development history, frontiers, and overall knowledge structure of the discipline to achieve multi-disciplinary integration.

As illustrated in FIG. 1, the method for training a multivariate relationship generation model includes the following.

At S101, a plurality of knowledge text entries are obtained.

The knowledge text entry such as "Mary Curie won the Nobel Prize in Physics together with Pierre Curie and Henry Becquerel in 1903" is a knowledge text entry represented by a quintuple relationship. The knowledge text entry may also relate to a relationship representation of any number of variants, for example, a ternary relationship representation, a quaternary relationship representation, a sextuple relationship representation, etc., which will not be limited here.

The relationship representation in each knowledge text entry mentioned above in the embodiments of the present disclosure may relate to any number of variants, so that when a plurality of knowledge text entries are taken as training data, feature dimensions of the training data may be effectively expanded, and an accuracy of model training may be guaranteed.

At S102, semantic parsing is performed on each knowledge text entry to obtain a plurality of entities and semantic information of each knowledge text entry.

After a plurality of knowledge text entries are obtained, semantic analysis may be performed on each knowledge text entry, to obtain respective entities and semantic information of the knowledge text entry.

Taking the above knowledge text entry "Marie Curie won the Nobel Prize in Physics together with Pierre Curie and Henry Becquerel in 1903" as an example, the entities may include, for example, "Mary Curie" and "Gained Award" "Award-Gaining Time" "Co-winner" "Co-winner", and correspondingly, the semantic information may be configured to describe the semantics corresponding to the knowledge text entry, or may also be configured to describe actual semantic content of the each entity, for example, "1903", "Nobel Prize in Physics", "Pierre Curie", "Henri Becquerel", etc., which will not be limited here.

In some embodiments, semantic parsing may be performed on the knowledge text entry to obtain the corresponding plurality of entities and semantic information as follows. Semantic parsing may be performed on the knowledge text entry to obtain a plurality of entities in the knowledge text entry; a prime attribute and a secondary attribute are determined from the plurality of entities; prime content corresponding to the prime attribute and secondary content corresponding to the secondary attribute are determined; and the prime content and secondary content are taken as the semantic information.

Taking the knowledge text entry "Marie Curie won the Nobel Prize in Physics with Pierre Curie and Henry Becquerel in 1903" as an example, the entities may include, for example, "Mary Curie" and "Gained Award" "Award-Gaining Time" "Co-winner" "Co-winner", and correspondingly, the prime attribute may be "Gained Award", and the secondary attributes may include "Award-Gaining Time" "Co-winner" "Co-winner". Correspondingly, "Nobel Prize in Physics" corresponding to the prime attribute "Gained Award" may be referred to as the prime content. "1903" corresponding to the secondary attribute "Award-Gaining Time", and "Pierre Curie" and "Henry Becquerel" corresponding to the secondary attribute "Co-winner" may be referred to as the secondary content.

That is, in embodiments of the present disclosure, each multivariate knowledge text entry may be represented by a combination of a core triple (the core triple includes at least part of entities, and contents corresponding to the entities) and a secondary attribute-value pair, specifically, for example, the quintuple knowledge text entry "Marie Curie won the Nobel Prize in Physics with Pierre Curie and Henry Becquerel in 1903" may be represented by:

(Mary Curie, Gained Award, Nobel Prize in Physics)
Award-Gaining Time: 1903
Co-winner: Pierre Curie
Co-winner: Henry Becquerel (Mary Curie, Gained Award, Nobel Prize in Physics) is a core triple, and "Award-Gaining Time: 1903", "Co-winner: Pierre Cori", "Co-winner: Henry Becquerel" are secondary attribute-value pairs supplementary to the core triple.

In the embodiments of the present disclosure, Mary Curie and Gained Award in the core triple may be abstracted as corresponding entities, and Mary Curie and Gained Award in the triple may be taken as the prime attribute which may be combined with the secondary attribute, or any other possible combinations are feasible, which will not be limited here.

Semantic parsing may be performed on the knowledge text entry to obtain a plurality of entities in the knowledge text entry; the prime attribute and the secondary attribute are determined from the plurality of entities; the prime content corresponding to the prime attribute and the secondary content corresponding to the secondary attribute are determined; and the prime content and secondary content are taken as the semantic information, thereby effectively expanding feature dimensions of the training data, and guaranteeing an accuracy of model training, and causing the trained multivariate relationship generation model to learn semantic integrity of the multivariate knowledge entries to a greater degree.

In other embodiments, semantic parsing may be performed on the knowledge text entry in other possible ways to obtain the corresponding plurality of entities and semantic information, for example, mathematical way, engineering way, which will not be limited here.

At S103, a heterogeneous graph is constructed based on the plurality of entities and the semantic information.

After semantic parsing is performed on the knowledge text entries to obtain the corresponding plurality of entities and semantic information, and a heterogeneous graph may be constructed according to the entities and the semantic information.

The heterogeneous graph is a kind of graph model, and the graph model may be a graph model in deep learning, or a graph model of any other possible architectural form in the field of AI technologies, which is not limited here. More than one type of nodes and edges may exist in the heterogeneous graph, and different types of nodes are allowed to have features or attributes in different dimensions, that is, the heterogeneous graph is constructed based on entities and semantic information, and the types of nodes in the heterogeneous graph may be the same or different, and the heterogeneous graph may carry features or attributes in different dimensions associated with the knowledge text entries.

In some embodiments, the heterogeneous graph is constructed based on entities and semantic information as follows. The plurality of entities, the prime attribute, the secondary attribute, the prime content and the secondary content may be mapped to nodes; parts of speech of the plurality of entities, the prime attribute, the secondary attribute, the prime content and the secondary content are used to describe parts of speech of the nodes; an edge is constructed between nodes having a corresponding relationship; a part-of-speech type of each edge is formed based on the parts of speech of the nodes connected by the edge; and each edge is labeled with the part-of-speech type to construct the heterogeneous graph based on the nodes, the edges, and edge labels.

Whether two nodes have a corresponding relationship may be determined based on the semantic information or the part of speech of each node. For example, the corresponding relationship may refer to a semantic association relation, a part-of-speech association relation. When two nodes are determined to be associated in terms of semantic, it may be determine that the two nodes have a corresponding relationship. When two nodes are determined to be associated in terms of part of speech, it may be determine that the two nodes have a corresponding relationship.

The parts of speech may include, for example, subject, predicate, and object. An edge may connect two nodes. If the parts of speech corresponding to two nodes are subject and predicate, the pan-of-speech type of the corresponding edge is subject-predicate type.

Figure 2:
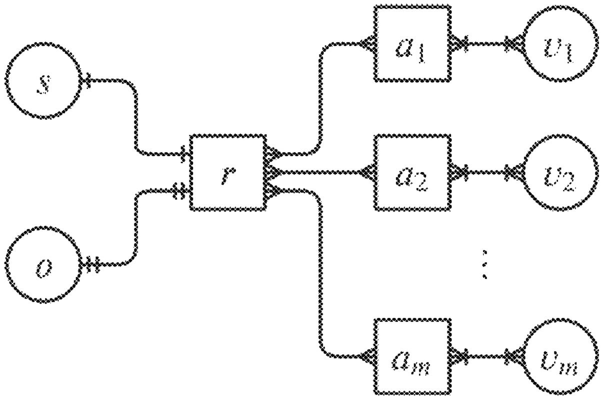
FIG. 2 is a schematic diagram illustrating a heterogeneous graph according to an embodiment of the present disclosure.

For example, each multivariate knowledge text entry may be represented by a combination of a core triple (s, r, o) and secondary attribute-value pairs $(a_i, v_i)$, that is, $$((s, r, o), \{(a_i, v_i)\}_{i=1}^{m}),$$

where m is the number of the secondary attribute-value pairs. In the embodiment of the present disclosure, a multivariate knowledge text entry such as $$((s, r, o), \{(a_i, v_i)\}_{i=1}^{m})$$

may be represented by a heterogeneous graph. As illustrated in FIG. 2, FIG. 2 is a schematic diagram illustrating a heterogeneous graph according to an embodiment of the present disclosure. In FIG. 2, different shapes of edges correspond to different part-of-speech types, ε is a set of nodes in the graph, containing all entities (values) and relationships (attributes) in the corresponding multivariate knowledge text entry, that is, $\varepsilon=\{r, s, o, a_1, \ldots, a_m, v_1, \ldots, v_m\}$. $\mathcal{L}$ is a set of edges in the graph, which contains four part-of-speech types, (2m+2) edges in total, that is:

subject-predicate edge (s, r), one in total;

object-predicate edge (a, r), one in total;

predicate-attribute edge $(r, a_i)$, m in total;

attribute-value edge $(a_i, v_i)$, m in total.

In the heterogeneous graph in the embodiment of the present disclosure, the nodes and edges having corresponding part-of-speech types are included. Nodes relate to two types, i.e., entities and relationships (relationships include the prime attribute, the secondary attribute, the prime content, and the secondary content), and the part-of-speech types of the edges may be subject-predicate, object-predicate, predicate-attribute, and attribute-value. In the embodiment of the present disclosure, by constructing the heterogeneous graph based on entities and semantic information, the integrity of the knowledge entries may be retained to the greatest extent without losing semantic information, so that the heterogeneous graph completely retains the semantic information of the multivariate knowledge text entries, which may effectively assist in improving a modeling effect of the multivariate relationship generation model.

At S104, an initial artificial intelligence (AI) network model is trained based on the heterogeneous graph to obtain a multivariate relationship generation model.

After the heterogeneous graph is constructed based on entities and semantic information, an initial AI network model is trained according to the heterogeneous graph to obtain the multivariate relationship generation model, for example, each node and edge in the heterogeneous graph, as well as features or attributes in multiple dimensions carried by the nodes and edges may be input to the initial AI network model till the AI network model converges, and the trained AI network model is taken as the multivariate relationship generation model.

The AI network model may be, for example, a neural network model, a machine learning (ML) model, etc. In the embodiment of the present disclosure, a graph neural network model may be configured to train and obtain the multivariate relationship generation model, and a graph neural network technology is configured to model the heterogeneous graph, which may fully capture potential relations between various variants (entity, prime attribute, secondary attribute and corresponding contents) in the multivariate knowledge text entry.

In the embodiment, by obtaining a plurality of knowledge text entries, performing semantic parsing on each knowledge text entry to obtain a plurality of entities and semantic information, constructing a heterogeneous graph according to the entities and the semantic information, and training an initial AI network model according to the heterogeneous graph to obtain a multivariate relationship generation model, the semantic integrity of the multivariate knowledge entries may be learned to a greater degree, thereby effectively improving an accuracy of a multivariate relationship representation of the multivariate relationship generation model, and achieving more accurate multivariate knowledge reasoning.

Figure 3:
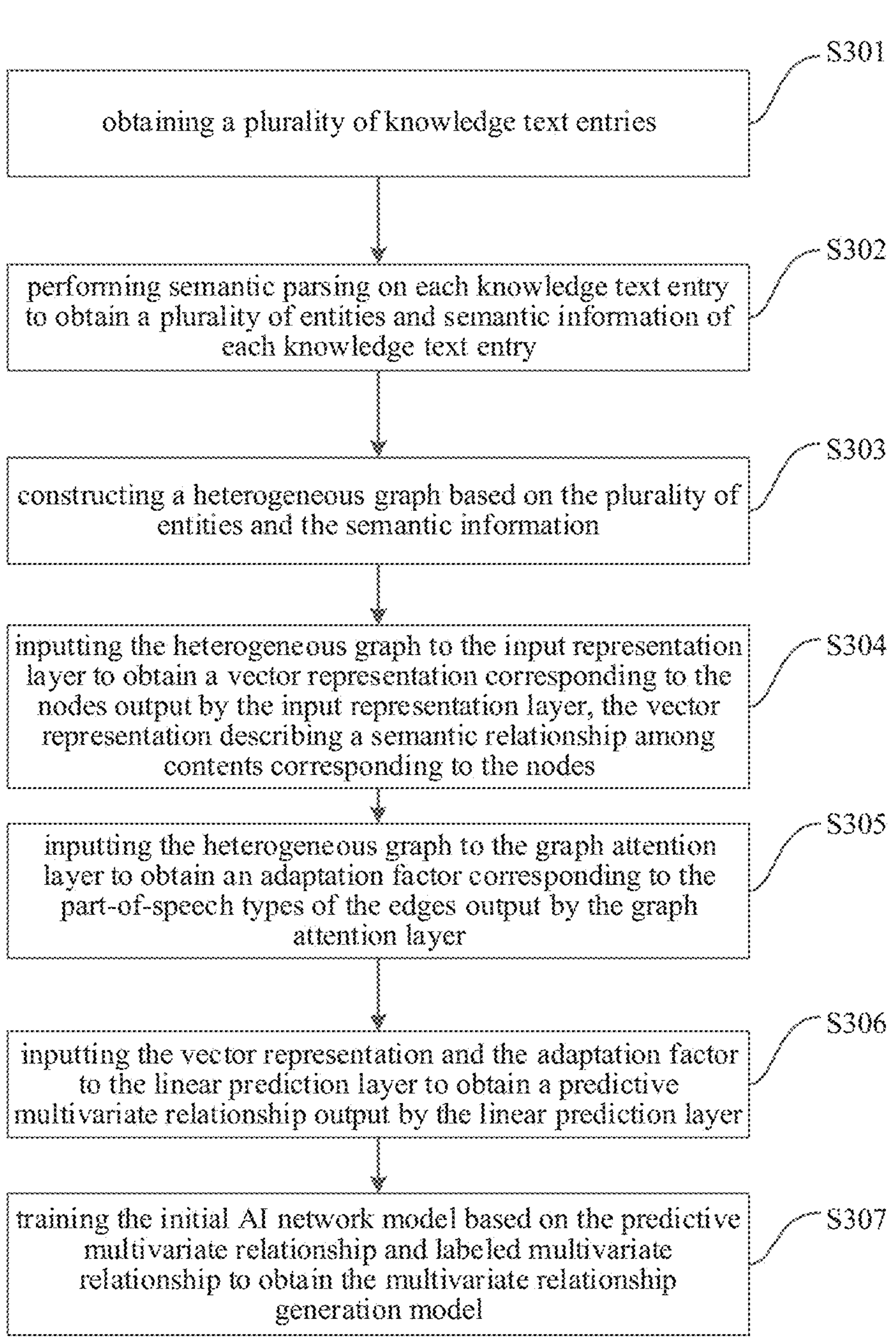
FIG. 3 is a flow chart illustrating a method for training a multivariate relationship generation model according to a second embodiment of the present disclosure.

FIG. 3 is a flow chart illustrating a method for training a multivariate relationship generation model according to a second embodiment of the present disclosure.

As illustrated in FIG. 3, the method for training a multivariate relationship generation model includes the following.

At S301, a plurality of knowledge text entries are obtained.

At S302, semantic parsing is performed on each knowledge text entry to obtain a plurality of entities and semantic information.

At S303, a heterogeneous graph is constructed based on the plurality of entities and the semantic information.

The explanation of S301 to S303 may refer to the above embodiments, which will not be repeated here.

At S304, the heterogeneous graph is input to an input representation layer to obtain a vector representation corresponding to the nodes output by the input representation layer, the vector representation describing a semantic relationship among contents corresponding to the nodes.

That is, the initial AI network model in the embodiment of the present disclosure includes the input representation layer, a graph attention layer (there may be multiple graph attention layers, such as L layers, and the graph attention layers are arranged in sequence), and a linear prediction layer.

Figure 4:
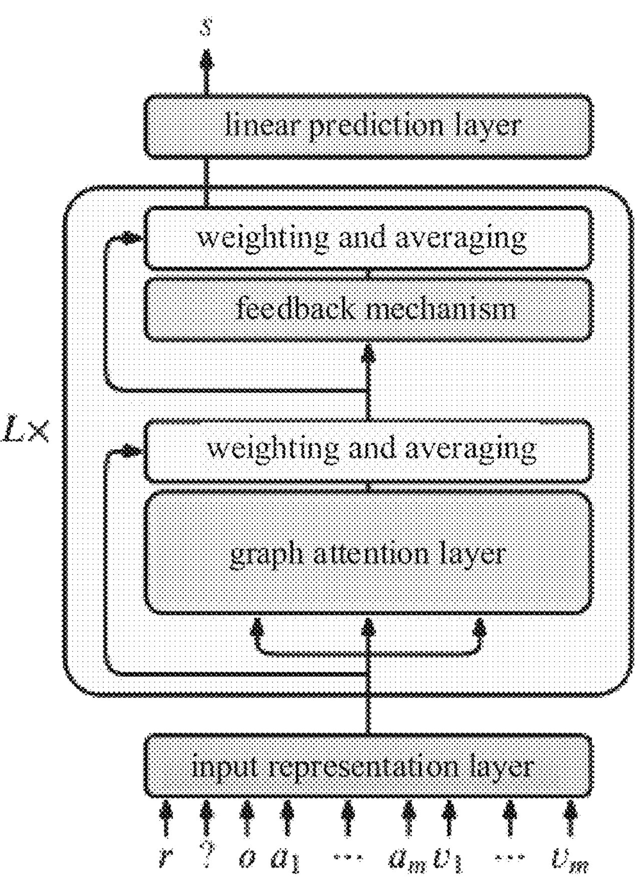
FIG. 4 is a schematic diagram illustrating an initial artificial intelligence (AI) network model according to an embodiment of the present disclosure.

FIG. 4 is a schematic diagram illustrating an initial AI network model according to an embodiment of the present disclosure, which includes the input representation layer, L graph attention layers and the linear prediction layer.

After the heterogeneous graph is constructed based on entities and semantic information, the heterogeneous graph may be input to the input representation layer to obtain the vector representation corresponding to the nodes output by the input representation layer, so that the vector representation may describe the semantic relationship among contents corresponding to the nodes, thereby effectively integrating the heterogeneous graph and the AI network model, and causing the AI network model to quickly learn the semantic relationship among the contents corresponding to the nodes.

At S305, the heterogeneous graph is input to the graph attention layer to obtain an adaptation factor corresponding to the part-of-speech types of the edges output by the graph attention layer.

After the heterogeneous graph is input to the input representation layer to obtain the vector representation corresponding to the nodes output by the input representation layer, the vector representation output by the input representation layer may be further configured as labels of the nodes in the heterogeneous graph, and the labeled heterogeneous graph may be input to the graph attention layer to obtain the adaptation factor corresponding to the part-of-speech types of the edges output by the graph attention layer. The form of the adaptation factor may be a vector, and the adaptation factor may be configured to describe proportions of the part-of-speech types of its corresponding edges in the entire knowledge text entry.

After the heterogeneous graph is input to the graph attention layer to obtain the adaptation factor corresponding to the part-of-speech types of the edges output by the graph attention layer an attention intensity value of the graph attention layer may be further adjusted according to the adaptation factor, thereby forming a more accurate edge perception based self-attention mechanism to quickly and accurately model the heterogeneity of a graph.

At S306, a predictive multivariate relationship output by the linear prediction layer is obtained by inputting the vector representation and the adaptation factor to the linear prediction layer.

After the heterogeneous graph is input to the input representation layer to obtain the vector representation corresponding to the nodes output by the input representation layer, and the heterogeneous graph is input to the graph attention layer to obtain the adaptation factor corresponding to the part-of-speech types of the edges output by the graph attention layer, the predictive multivariate relationship output by the linear prediction layer may be obtained by inputting the vector representation and the adaptation factor to the linear prediction layer.

That is, in the training process, a plurality of knowledge text entries are configured to train the initial AI network model, that is, the initial AI network model is configured to predict a multivariate relationship for each knowledge text entry, and the multivariate relationship obtained by prediction may be referred to as the predictive multivariate relationship, and then the predictive multivariate relationship is judged accordingly till it is determined that the AI network model converges according to the predictive multivariate relationship.

For example, the multivariate knowledge reasoning is transformed into a node prediction problem on a heterogeneous graph, taking predicting a subject s in the multivariate knowledge entry $$((s, r, o), \{(a_i, v_i)\}_{i=1}^{m})$$

for an example (the multivariate relationship obtained by prediction may be referred to as the predictive multivariate relationship), the input of the AI network model is a heterogeneous graph $$((?, r, o), \{(a_i, v_i)\}_{i=1}^{m})$$

with missing nodes, and the output is a predictive multivariate relationship (including a predicted target node subject s).

At S307, the initial AI network model is trained based on the predictive multivariate relationship and labeled multivariate relationship to obtain the multivariate relationship generation model.

In some embodiments, a multivariate relationship may be labeled for each knowledge text entry in advance.

In some embodiments, the initial AI network model is trained based on the predictive multivariate relationship and the labeled multivariate relationship to obtain the multivariate relationship generation model as follows. A loss value between the predictive multivariate relationship and the labeled multivariate relationship is determined; if the loss value satisfies a preset loss threshold, the trained AI network model is taken as the multivariate relationship generation model, thereby achieving a better model training effect.

The loss value may be calculated from a loss function corresponding to the initial AI network model. In applications, the loss function is usually associated with an optimization problem as a learning criterion, that is, the model is solved and evaluated by minimizing the loss function, therefore, in the embodiment, the loss value between the predictive multivariate relationship and the labeled multivariate relationship may be determined to guide the training process.

After the loss value between the predictive multivariate relationship and the labeled multivariate relationship is determined, it may be determined in real time whether the loss value satisfies a preset loss threshold (the preset loss threshold may be pre-calibrated threshold of the loss value for determining whether the AI network model converges).

If the loss value satisfies the preset loss threshold, the trained AI network model is taken as the multivariate relationship generation model, that is, the model training is completed, and the multivariate relationship generation model at this time satisfies a preset convergence condition.

In the embodiment, by obtaining a plurality of knowledge text entries, performing semantic parsing on each knowledge text entry to obtain a plurality of entities and semantic information, constructing a heterogeneous graph according to the entities and the semantic information, and training an initial artificial intelligence (AI) network model according to the heterogeneous graph to obtain a multivariate relationship generation model, the semantic integrity of the multivariate knowledge entries may be learned to a greater degree, thereby effectively improving an accuracy of a multivariate relationship representation of the multivariate relationship generation model, and achieving more accurate multivariate knowledge reasoning. After a heterogeneous graph is constructed based on entities and semantic information, the heterogeneous graph may be input to an input representation layer to obtain a vector representation corresponding to the nodes output by the input representation layer, the heterogeneous graph is input to a graph attention layer to obtain an adaptation factor corresponding to the part-of-speech types of the edges output by the graph attention layer, and a predictive multivariate relationship output by the linear prediction layer may be obtained by inputting the vector representation and the adaptation factor to the linear prediction layer, so that the vector representation may describe a semantic relationship among contents corresponding to the nodes, thereby effectively integrating the heterogeneous graph and the A1 network model, causing the AI network model to quickly learn the semantic relationship among the contents corresponding to the nodes. After the heterogeneous graph is input to a graph attention layer to obtain an adaptation factor corresponding to the part-of-speech types of the edges output by the graph attention layer, an attention intensity value of the graph attention layer may be further adjusted according to the adaptation factor, thereby forming a more accurate self-attention mechanism of edge perception to quickly and accurately model the heterogeneity of a graph.

Figure 5:
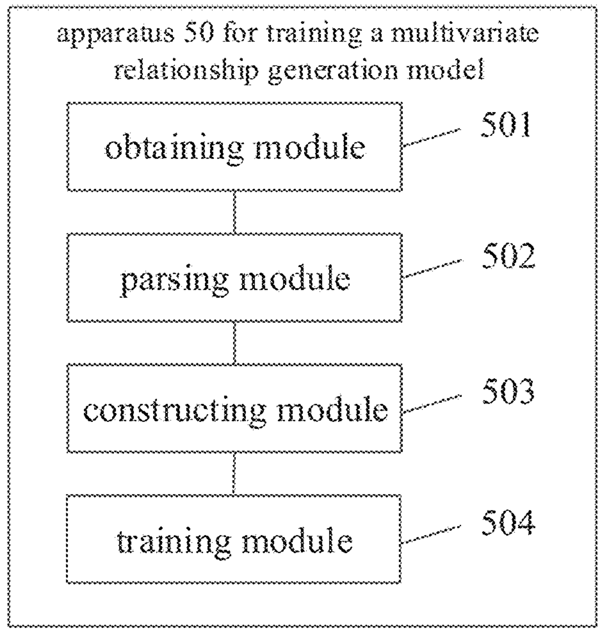
FIG. 5 is a block diagram illustrating an apparatus for training a multivariate relationship generation model according to a third embodiment of the present disclosure.

FIG. 5 is a block diagram illustrating an apparatus for training a multivariate relationship generation model according to a third embodiment of the present disclosure.

As illustrated in FIG. 5, the apparatus 50 for training a multivariate relationship generation model includes: an obtaining module 501, configured to obtain a plurality of knowledge text entries a parsing module 502, configured to perform semantic parsing on each knowledge text entry to obtain a plurality of entities and semantic information of each knowledge text entry; a constructing module 503, configured to construct a heterogeneous graph based on the plurality of entities and the semantic information; and a training module 504, configured to train an initial artificial intelligence (AI) network model based on the heterogeneous graph to obtain a multivariate relationship generation model.

In some embodiments, the parsing module 502 is configured to: perform semantic parsing on a knowledge text entry to obtain the plurality of entities in the knowledge text entry; determine a prime attribute and a secondary attribute from the plurality of entities in the knowledge text entry; determine prime content corresponding to the prime attribute, and secondary content corresponding to the secondary attribute; and take the prime content and the secondary content as the semantic information of the knowledge text entry.

Figure 6:
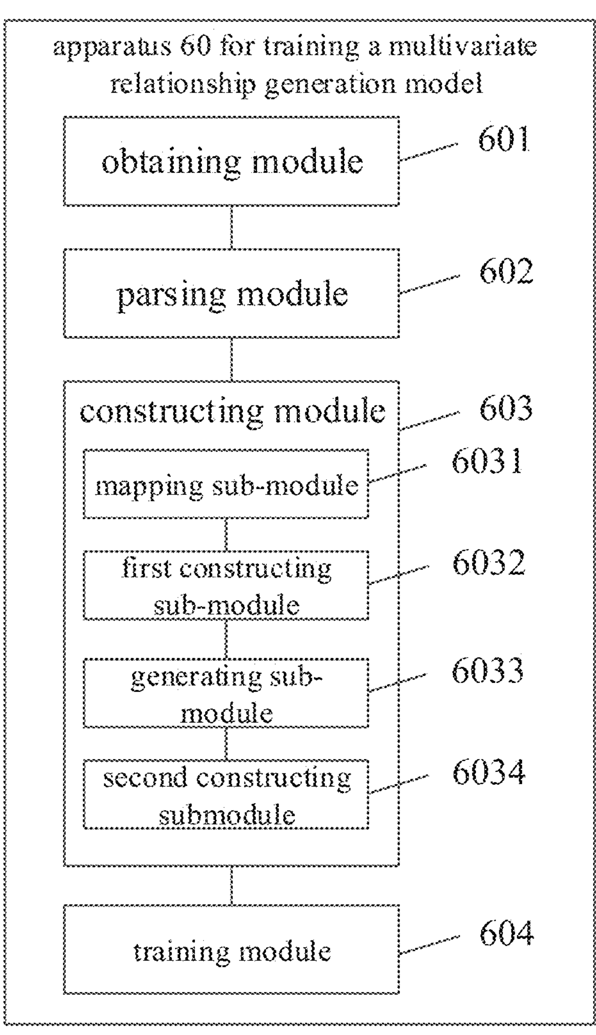
FIG. 6 is a block diagram illustrating an apparatus for training a multivariate relationship generation model according to a fourth embodiment of the present disclosure.

In some embodiments of the present disclosure, as illustrated in FIG. 6, FIG. 6 is a block diagram illustrating an apparatus for training a multivariate relationship generation model according to a fourth embodiment of the present disclosure. The apparatus 60 for training a multivariate relationship generation model includes an obtaining module 601, a parsing module 602, a constructing module 603, and a training module 604, in which the constructing module 603 includes: a mapping sub-module 6031, configured to map the plurality of entities, the prime attribute, the secondary attribute, the prime content and the secondary content to nodes, and describe parts of speech of the nodes based on parts of speech of the plurality of entities, the prime attribute, the secondary attribute, the prime content and the secondary content; a first constructing sub-module 6032, configured to construct an edge between nodes having a corresponding relationship; a generating sub-module 6033, configured to f form a part-of-speech type of each edge based on the parts of speech of the nodes connected by the edge; and a second constructing sub-module 6034, configured to label each edge with the pan-of-speech type to construct the heterogeneous graph based on the nodes, the edges, and edge labels.

In some embodiments of the present disclosure, the initial artificial intelligence (AI) network model includes an input representation layer, a graph attention layer and a linear prediction layer. The training module 604 is configured to: input the heterogeneous graph to the input representation layer to obtain a vector representation corresponding to the nodes output by the input representation layer, the vector representation describing a semantic relationship among contents corresponding to the nodes; input the heterogeneous graph to the graph attention layer to obtain an adaptation factor corresponding to the part-of-speech types of the edges output by the graph attention layer; input the vector representation and the adaptation factor to the linear prediction layer to obtain a predictive multivariate relationship output by the linear prediction layer; and train the initial AI network model based on the predictive multivariate relationship and labeled multivariate relationship to obtain the multivariate relationship generation model.

In some embodiments, a training module 604 is configured to: adjust an attention intensity value of the graph attention layer based on the adaptation factor.

In some embodiments, a training module 604 is configured to: determine a loss value between the predictive multivariate relationship and the labeled multivariate relationship; if the loss value satisfies a preset loss threshold, taking the trained AI network model as the multivariate relationship generation model.

It is understandable that, the apparatus 60 for training a multivariate relationship generation model in FIG. 6 of the embodiment and the apparatus 50 for training a multivariate relationship generation model in the above embodiment, the obtaining module 601 and the obtaining module 501 in the above embodiment, the parsing module 602 and the parsing module 502 in the above embodiment, the constructing module 603 and the constructing module 503 in the above embodiment, the training module 604 and the training module 504 in the above embodiment, have the same functions and structures.

It needs to be noted that the foregoing explanation of the method for training a multivariate relationship generation model is also applied to an apparatus for training a multivariate relationship generation model in this embodiment, which will not be repeated here.

In the embodiment, by obtaining a plurality of knowledge text entries, performing semantic parsing on each knowledge text entry to obtain a plurality of entities and semantic information, constructing a heterogeneous graph according to the entities and the semantic information, and training an initial artificial intelligence (AI) network model according to the heterogeneous graph to obtain a multivariate relationship generation model, the semantic integrity of the multivariate knowledge entries may be learned to a greater degree, thereby effectively improving an accuracy of a multivariate relationship representation of the multivariate relationship generation model, and achieving more accurate multivariate knowledge reasoning.

In the embodiment of the present disclosure, an electronic device, a readable storage medium and a computer program product are further provided according to embodiments of the present disclosure.

Figure 7:
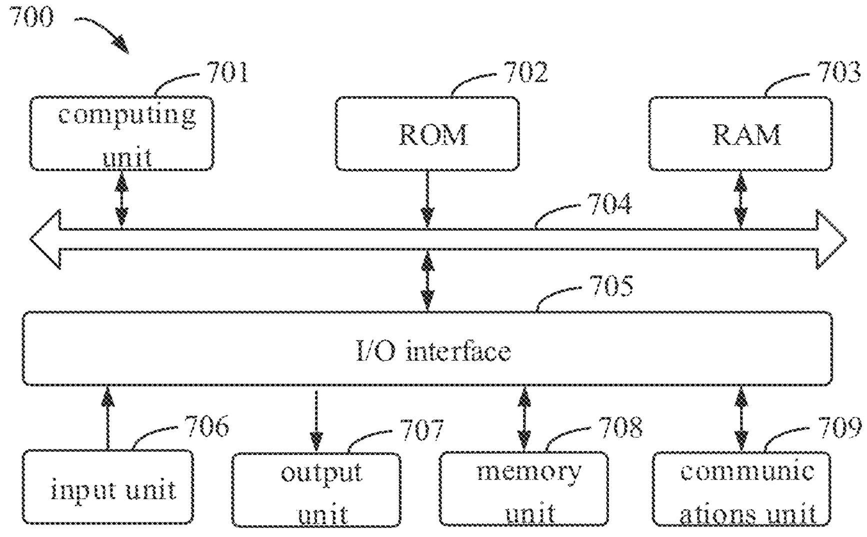
FIG. 7 is a block diagram illustrating an electronic device configured to implement a method for training a multivariate relationship generation model according to an embodiment of the present disclosure.

FIG. 7 is a block diagram illustrating an electronic device configured to implement a method for training a multivariate relationship generation model in the embodiment of the present disclosure. An electronic device is intended to represent various types of digital computers, such as laptop computers, desktop computers, workstations, personal digital assistants, servers, blade servers, mainframe computers, and other suitable computers. An electronic device may also represent various types of mobile apparatuses, such as personal digital assistants, cellular phones, smart phones, wearable devices, and other similar computing devices. The components shown herein, their connections and relations, and their functions are merely examples, and are not intended to limit the implementation of the disclosure described and/or required herein.

As illustrated in FIG. 7, a device 700 includes a computing unit 701, configured to execute various appropriate actions and processes according to a computer program stored in a read-only memory (ROM) 702 or loaded from a memory unit 708 to a random access memory (RAM) 703. In a RAM 703, various programs and data required for a device 700 may be stored. A computing unit 701, a ROM 702 and a RAM 703 may be connected with each other by a bus 704. An input/output(I/O) interface 705 is also connected to a bus 704.

A plurality of components in the device 700 are connected to an I/O interface 705, and includes: an input unit 706, for example, a keyboard, a mouse, etc.; an output unit 707, for example various types of displays, speakers; a memory unit 708, for example a magnetic disk, an optical disk; and a communications unit 709, for example, a network card, a modem, a wireless transceiver. A communications unit 709 allows a device 700 to exchange information/data through a computer network such as internet and/or various types of telecommunication networks and other devices.

A computing unit 701 may be various types of general and/or dedicated processing components with processing and computing ability. Some examples of a computing unit 701 include but not limited to a central processing unit (CPU), a graphics processing unit (GPU), various dedicated artificial intelligence (AI) computing chips, various computing units running a machine learning model algorithm, a digital signal processor (DSP), and any appropriate processor, controller, microcontroller, etc. A computing unit 701 executes various methods and processes as described above, for example, a method for training a multivariate relationship generation model.

For example, in some embodiments, a method for training a multivariate relationship generation model may be further implemented as a computer software program, which is physically contained in a machine readable medium, such as a memory unit 708. In some embodiments, a part or all of the computer program may be loaded and/or installed on the device 700 through a ROM 702 and/or a communication units 709. When the computer program is loaded on a RAM 703 and executed by a computing unit 701, one or more blocks in the method for training a multivariate relationship generation model as described above may be performed. Alternatively, in other embodiments, a computing unit 701 may be configured to execute a method for training a multivariate relationship generation model in other appropriate methods (for example, by virtue of a firmware).

Various implementation modes of systems and technologies described herein may be implemented in a digital electronic circuit system, an integrated circuit system, a field programmable gate array(FPGA), a dedicated application specific integrated circuit (ASIC), a system on a chip (SoC), a load programmable logic device (CPLD), a computer hardware, a firmware, a software, and/or combinations thereof. The various implementation modes may include: being implemented in one or more computer programs, and the one or more computer programs may be executed and/or interpreted on a programmable system including at least one programmable processor, and the programmable processor may be a dedicated or a general-purpose programmable processor that may receive data and instructions from a storage system, at least one input apparatus, and at least one output apparatus, and transmit the data and instructions to the storage system, the at least one input apparatus, and the at least one output apparatus.

A computer code configured to execute a method for training a multivariate relationship generation model in the present disclosure may be written with one or any combination of multiple programming languages. These programming languages may be provided to a processor or a controller of a general purpose computer, a dedicated computer, or other apparatuses for programmable data processing so that the function/operation specified in the flowchart and/or block diagram may be performed when the program code is executed by the processor or controller. A computer code may be executed completely or partly on the machine, executed partly on the machine as an independent software package and executed partly or completely on the remote machine or server.

In the context of the present disclosure, a machine-readable medium may be a tangible medium that may contain or store a program intended for use in or in conjunction with an instruction execution system, apparatus, or device. A machine-readable medium may be a machine readable signal medium or a machine readable storage medium. A machine readable storage medium may include but not limited to an electronic, magnetic, optical, electromagnetic, infrared, or semiconductor system, apparatus or device, or any appropriate combination thereof. A more specific example of a machine readable storage medium includes an electronic connector with one or more cables, a portable computer disk, a hardware, a random access memory (RAM), a read-only memory (ROM), an erasable programmable read-only memory(an EPROM or a flash memory),an optical fiber device, and a portable optical disk read-only memory(CDROM), an optical storage device, a magnetic storage device, or any appropriate combination of the above.

In order to provide interaction with the user, the systems and technologies described here may be implemented on a computer, and the computer has: a display apparatus for displaying information to the user (for example, a CRT (cathode ray tube) or a LCD (liquid crystal display) monitor); and a keyboard and a pointing apparatus (for example, a mouse or a trackball) through which the user may provide input to the computer. Other types of apparatuses may further be configured to provide interaction with the user; for example, the feedback provided to the user may be any form of sensory feedback (for example, visual feedback, auditory feedback, or tactile feedback); and input from the user may be received in any form (including an acoustic input, a voice input, or a tactile input).

The systems and technologies described herein may be implemented in a computing system including back-end components (for example, as a data server), or a computing system including middleware components (for example, an application server), or a computing system including front-end components (for example, a user computer with a graphical user interface or a web browser through which the user may interact with the implementation mode of the system and technology described herein), or a computing system including any combination of such back-end components, middleware components or front-end components. The system components may be connected to each other through any firm or medium of digital data communication (for example, a communication network). Examples of communication networks include: a local area network (LAN), a wide area network (WAN), an internet and a blockchain network.

The computer system may include a client and a server. The client and server are generally far away from each other and generally interact with each other through a communication network. The relation between the client and the server is generated by computer programs that run on the corresponding computer and have a client-server relationship with each other. A server may be a cloud server, also known as a cloud computing server or a cloud host, is a host product in a cloud computing service system, to solve the shortcomings of large management difficulty and weak business expansibility existed in the traditional physical host and Virtual Private Server (VPS) service. A server further may be a server with a distributed system, or a server in combination with a blockchain.

It should be understood that, various forms of procedures shown above may be configured to reorder, add or delete blocks. For example, blocks described in the present disclosure may be executed in parallel, sequentially, or in a different order, as long as the desired result of the technical solution disclosed in the present disclosure may be achieved, which will not be limited herein.

The above specific implementations do not constitute a limitation on the protection scope of the present disclosure. Those skilled in the art should understand that various modifications, combinations, sub-combinations and substitutions may be made according to design requirements and other factors. Any modification, equivalent replacement, improvement, etc., made within the spirit and principle of embodiments of the present disclosure shall be included within the protection scope of embodiments of the present disclosure.

What is claimed is:

1. A method for training a multivariate relationship generation model, comprising:

obtaining a plurality of knowledge text entries;

performing semantic parsing on each knowledge text entry to obtain a plurality of entities and semantic information of each knowledge text entry;

constructing a heterogeneous graph based on the plurality of entities and the semantic information; and training an initial artificial intelligence (AI) network model based on the heterogeneous graph to obtain a multivariate relationship generation model;

wherein, performing semantic parsing on each knowledge text entry to obtain a plurality of entities and semantic information of each knowledge text entry comprises:

performing semantic parsing on a knowledge text entry to obtain a core triple and a secondary attribute-value pair, wherein the core triple includes at least part of entities in the knowledge text entry and contents corresponding to the at least part of entities, wherein the at least part of entities indicate a subject, a predicate and an object of the knowledge text entry;

determining a prime attribute from the at least part of entities in the core triple and a secondary attribute from the secondary attribute-value pair;

determining prime content corresponding to the prime attribute, and secondary content corresponding to the secondary attribute; and taking the prime content and the secondary content as the semantic information of the knowledge text entry;

wherein, constructing a heterogeneous graph based on the plurality of entities and the semantic information comprises:

mapping the plurality of entities, the prime attribute, the secondary attribute, the prime content and the secondary content to nodes;

describing parts of speech of the nodes based on parts of speech of the plurality of entities, the prime attribute, the secondary attribute, the prime content and the secondary content;

constructing an edge between nodes having a corresponding relationship;

forming a part-of-speech type of each edge based on the parts of speech of the nodes connected by the edge; and labeling each edge with the part-of-speech type to construct the heterogeneous graph based on the nodes, the edges, and edge labels;

wherein the initial AI network model comprises an input representation layer, a graph attention layer and a linear prediction layer, wherein, training the initial AI network model based on the heterogeneous graph to obtain a multivariate relationship generation model comprises:

inputting the heterogeneous graph to the input representation layer to obtain a vector representation corresponding to the nodes output by the input representation layer, the vector representation describing a semantic relationship among contents corresponding to the nodes;

inputting the heterogeneous graph to the graph attention layer to obtain an adaptation factor corresponding to the part-of-speech types of the edges output by the graph attention layer;

inputting the vector representation and the adaptation factor to the linear prediction layer to obtain a predictive multivariate relationship output by the linear prediction layer; and training the initial AI network model based on the predictive multivariate relationship and pre-labeled multivariate relationship to obtain the multivariate relationship generation model.

2. The method of claim 1, after inputting the heterogeneous graph to the graph attention layer to obtain the adaptation factor corresponding to the part-of-speech types of the edges output by the graph attention layer, further comprising:

adjusting an attention intensity value of the graph attention layer based on the adaptation factor.

3. The method of claim 1, wherein, training the initial AI network model based on the predictive multivariate relationship and the pre-labeled multivariate relationship to obtain the multivariate relationship generation model comprises:

determining a loss value between the predictive multivariate relationship and the pre-labeled multivariate relationship;

if the loss value satisfies a preset loss threshold, taking the trained AI network model as the multivariate relationship generation model.

4. An electronic device, comprising:

at least one processor; and a memory communicatively coupled to the at least one processor;

wherein, the memory is stored with instructions executable by the at least one processor, when the instructions are executed by the at least one processor, the at least one processor is caused to execute a method for training a multivariate relationship generation model, comprising:

obtaining a plurality of knowledge text entries;

performing semantic parsing on each knowledge text entry to obtain a plurality of entities and semantic information of each knowledge text entry;

constructing a heterogeneous graph based on the plurality of entities and the semantic information; and training an initial artificial intelligence (AI) network model based on the heterogeneous graph to obtain a multivariate relationship generation model;

wherein, performing semantic parsing on each knowledge text entry to obtain a plurality of entities and semantic information of each knowledge text entry comprises:

performing semantic parsing on a knowledge text entry to obtain a core triple and a secondary attribute-value pair, wherein the core triple includes at least part of entities in the knowledge text entry and contents corresponding to the at least part of entities, wherein the at least part of entities indicate a subject, a predicate and an object of the knowledge text entry;

determining a prime attribute from the at least part of entities in the core triple and a secondary attribute from the secondary attribute-value pair;

determining prime content corresponding to the prime attribute, and secondary content corresponding to the secondary attribute; and taking the prime content and the secondary content as the semantic information of the knowledge text entry:

wherein, constructing a heterogeneous graph based on the plurality of entities and the semantic information comprises:

mapping the plurality of entities, the prime attribute, the secondary attribute, the prime content and the secondary content to nodes;

describing parts of speech of the nodes based on parts of speech of the plurality of entities, the prime attribute, the secondary attribute, the prime content and the secondary content;

constructing an edge between nodes having a corresponding relationship;

forming a part-of-speech type of each edge based on the parts of speech of the nodes connected by the edge; and labeling each edge with the part-of-speech type to construct the heterogeneous graph based on the nodes, the edges, and edge labels;

wherein the initial AI network model comprises an input representation layer, a graph attention layer and a linear prediction layer, wherein, training the initial AI network model based on the heterogeneous graph to obtain a multivariate relationship generation model comprises:

inputting the heterogeneous graph to the input representation layer to obtain a vector representation corresponding to the nodes output by the input representation layer, the vector representation describing a semantic relationship among contents corresponding to the nodes;

inputting the heterogeneous graph to the graph attention layer to obtain an adaptation factor corresponding to the part-of-speech types of the edges output by the graph attention layer;

inputting the vector representation and the adaptation factor to the linear prediction layer to obtain a predictive multivariate relationship output by the linear prediction layer; and training the initial AI network model based on the predictive multivariate relationship and pre-labeled multivariate relationship to obtain the multivariate relationship generation model.

5. The device of claim 4, wherein after inputting the heterogeneous graph to the graph attention layer to obtain the adaptation factor corresponding to the part-of-speech types of the edges output by the graph attention layer, the at least one processor is further configured to perform:

adjusting an attention intensity value of the graph attention layer based on the adaptation factor.

6. The device of claim 4, wherein, training the initial AI network model based on the predictive multivariate relationship and the pre-labeled multivariate relationship to obtain the multivariate relationship generation model comprises:

determining a loss value between the predictive multivariate relationship and the pre-labeled multivariate relationship;

if the loss value satisfies a preset loss threshold, taking the trained AI network model as the multivariate relationship generation model.

7. A non-transitory computer-readable storage medium having computer instructions stored thereon, wherein the computer instructions are configured to cause a computer to execute a method for training a multivariate relationship generation model, comprising:

obtaining a plurality of knowledge text entries;

performing semantic parsing on each knowledge text entry to obtain a plurality of entities and semantic information of each knowledge text entry;

constructing a heterogeneous graph based on the plurality of entities and the semantic information; and training an initial artificial intelligence (AI) network model based on the heterogeneous graph to obtain a multivariate relationship generation model;

wherein, performing semantic parsing on each knowledge text entry to obtain a plurality of entities and semantic information of each knowledge text entry comprises:

performing semantic parsing on a knowledge text entry to obtain a core triple and a secondary attribute-value pair, wherein the core triple includes at least part of entities in the knowledge text entry and contents corresponding to the at least part of entities, wherein the at least part of entities indicate a subject, a predicate and an object of the knowledge text entry;

determining a prime attribute from the at least part of entities in the core triple and a secondary attribute from the secondary attribute-value pair;

determining prime content corresponding to the prime attribute, and secondary content corresponding to the secondary attribute; and taking the prime content and the secondary content as the semantic information of the knowledge text entry;

wherein, constructing a heterogeneous graph based on the plurality of entities and the semantic information comprises:

mapping the plurality of entities, the prime attribute, the secondary attribute, the prime content and the secondary content to nodes;

describing parts of speech of the nodes based on parts of speech of the plurality of entities, the prime attribute, the secondary attribute, the prime content and the secondary content;

constructing an edge between nodes having a corresponding relationship;

forming a part-of-speech type of each edge based on the parts of speech of the nodes connected by the edge; and labeling each edge with the part-of-speech type to construct the heterogeneous graph based on the nodes, the edges, and edge labels;

wherein the initial AI network model comprises an input representation layer, a graph attention layer and a linear prediction layer, wherein, training the initial AI network model based on the heterogeneous graph to obtain a multivariate relationship generation model comprises:

inputting the heterogeneous graph to the input representation layer to obtain a vector representation corresponding to the nodes output by the input representation layer, the vector representation describing a semantic relationship among contents corresponding to the nodes;

inputting the heterogeneous graph to the graph attention layer to obtain an adaptation factor corresponding to the part-of-speech types of the edges output by the graph attention layer;

inputting the vector representation and the adaptation factor to the linear prediction layer to obtain a predictive multivariate relationship output by the linear prediction layer; and training the initial AI network model based on the predictive multivariate relationship and pre-labeled multivariate relationship to obtain the multivariate relationship generation model.

8. The storage medium of claim 7, wherein after inputting the heterogeneous graph to the graph attention layer to obtain the adaptation factor corresponding to the part-of-speech types of the edges output by the graph attention layer, the computer instructions are further configured to cause the computer to execute:

adjusting an attention intensity value of the graph attention layer based on the adaptation factor.

9. The storage medium of claim 7, wherein, training the initial AI network model based on the predictive multivariate relationship and the pre-labeled multivariate relationship to obtain the multivariate relationship generation model comprises:

determining a loss value between the predictive multivariate relationship and the pre-labeled multivariate relationship;

if the loss value satisfies a preset loss threshold, taking the trained AI network model as the multivariate relationship generation model.

* * * * *